July 4, 1961     G. A. LYON     2,991,128
WHEEL STRUCTURE
Filed July 23, 1958
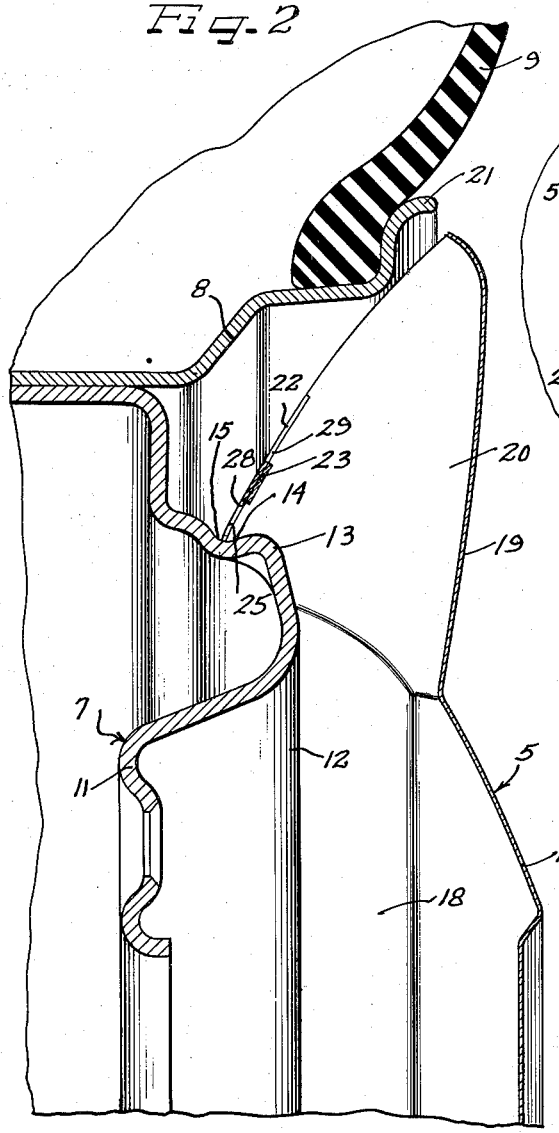
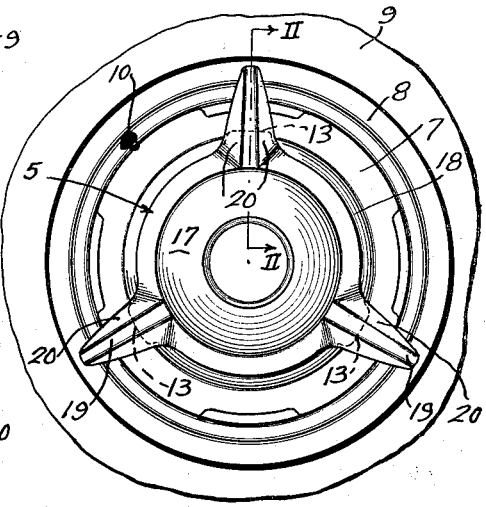
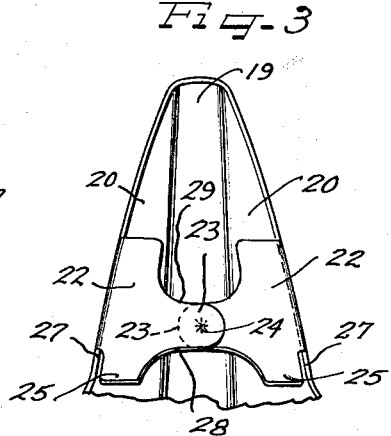
Inventor
George Albert Lyon "# United States Patent Office 2,991,128
Patented July 4, 1961

2,991,128
WHEEL STRUCTURE
George Albert Lyon, 13881 W. Chicago Blvd.,
Detroit 28, Mich.
Filed July 23, 1958, Ser. No. 750,389
17 Claims. (Cl. 301—37)

The present invention relates to improvements in wheel structures and more particularly concerns improvements in the ornamental and protective covering of the outer sides of vehicle wheels.

An important object of the present invention is to provide a vehicle wheel structure having thereon an improved hub cap type of cover.

Another object of the invention is to provide a vehicle wheel cover of the hub cap type having novel means for retaining the same on the outer side of a vehicle wheel.

A further object of the invention is to provide in a wheel structure of the type wherein the vehicle body has cover retaining bumps, a hub cap type of cover for the outer side of the wheel including novel means for retaining the cover on the wheel by engagement with the retaining bumps.

Still another object of the invention is to provide a hub cap type of wheel cover having a novel arrangement of arms projecting generally radially therefrom and provided with improved means for interengagement with retaining bumps on the wheel for press-on, snap-off retention of the cover on the wheel.

A still further object of the invention is to provide improved retaining means on ornamental integral radially projecting arms of a hub cap type of cover for effective separable interengagement with retaining shoulder structure on a vehicle wheel.

Other objects, features and advantages of the present invention will be readily apparent from the following detailed description of a preferred embodiment taken in conjunction with the accompanying drawing, in which FIGURE 1 is an outer side elevational view of a vehicle wheel embodying features of the invention;

FIGURE 2 is an enlarged fragmentary radial sectional detail view taken substantially on the line II—II of FIGURE 1; and FIGURE 3 is a fragmentary rear elevational view of one of the radially projecting arms of the cover showing the retaining means thereon for interengagement with a retaining bump of the wheel.

A hub cap type wheel cover 5 is constructed and arranged to be applied to the outer side of a vehicle wheel including a wheel body 7 of the disk spider type supporting a multi-flange, drop center tire rim 8 constructed and arranged to support a pneumatic tire 9 which may be of the tubeless type. A valve stem 10 is suitably supported by the tire rim.

Centrally the wheel body 7 is provided with a bolt-on flange 11 surrounded by an annular generally axially outwardly projecting nose bulge 12 provided at its radially outer side with a circumferentially spaced series of herein three generally radially outwardly projecting pressed retaining bumps 13 provided with respective generally undercut radially outwardly and axially inwardly facing retaining shoulders 14. On inspection of FIGURE 1, it will be observed that the retaining bumps 13 are of substantial width. Aligned with the innermost ends of the retaining shoulders 14 is an annular circumferentially extending slightly indented generally axially outwardly facing retaining shoulder 15 on the radially outer side of the nose bulge 12.

According to the present invention, the cover 5 is constructed and arranged to overlie the central portion of the wheel body 7 and to engage in press-on, pry-off relation with the retaining bumps 13. To this end, the cover 5 is preferably constructed as a hub cap from suitable sheet metal such as stainless steel or the like and comprises a central crown portion 17 with a side wall 18 extending generally radially outwardly and axially inwardly and of a diameter to engage at its terminal edge with the shoulder 15 for thereby maintaining the cover 5 in centered relation over the outer side of the wheel in protective, concealing relation over the bolt-on flange 11 and the nose bulge 12.

At intervals equal to and matching the retaining bumps 13 the cover side wall 18 is provided with integral generally radially extending ornamental arm projections 19 of hollow shape opening at their radially inner ends into the shell of the crown 17 of the cover and having side walls 20 which angularly join the cover side wall 18.

The crown ridge of each of the arms 19 extends from the crown 17, in this instance slightly angularly, while the major width of the side walls 20 is substantially coextensive with the cover side wall 18 and with the inner edges of the side walls 20 extending generally radially and axially outwardly to clear the tire rim 8 so that the radially outer ends of the arms 19 can extend freely into overlying relation to a terminal flange 21 of the tire rim.

At their radially inner ends, the arm side walls 20 in each instance are spaced apart sufficiently to receive therebetween one of the retaining bumps 13 when the terminal edge of the cover side wall 18 engages the wheel shoulder 15.

For effecting snap-on, pry-off retaining engagement with the respective retaining bumps, each of the arms 19 is provided on the side walls 20 thereof adjacent to the radially inner ends of the side walls with retaining means inter-engageable with the retaining shoulders 14 of the respective bumps. To this end, with respect to each of the arms 19 a cover retaining extension flange 22 is provided which may be substantially identical for each side wall. Each of the flanges 22 comprises an integral one-piece extension from the inner edge of the side wall 20 bent toward the inside of the axially inwardly opening side of the arm to extend partially across the space between the edges of the side walls and with overlapping respective end portions 23 of the flanges 22 secured permanently together as by means of spot welding 24. This provides a solid bridge across the gap between the edges of the arm side walls 20.

At the radially inner side of the combined bridge afforded by the flanges 22, each of the flanges has a generally radially and axially inwardly directed cover retaining tab finger extension portion 25 which for increased resilient flexibility is separated from the adjacent arm side wall 20 by means of a cut out or notch 27. It will also be observed that the connecting flange extensions 23 are cut back or inset relative to the retaining tab fingers 25 so as to provide a recess or clearance 28 of substantial width and depth between the tab fingers.

At their inner free terminals, the retaining finger tabs 25 extend to a diameter which is slightly less than the diameter on which the inner ends of the undercut retaining bump shoulders 14 lie. Furthermore, the free, retaining terminal edges of the finger tabs 25 extend to substantially the plane of the inner terminal edge of the cover side wall 18.

In applying the cover 5 to the outer side of the wheel, the cover is generally oriented with respect to the wheel to receive the retaining bumps 13 within the respective hollow shell interiors of the respective arms 19, two adjacent ones of the retaining bumps 13 being first engaged by a canted assembly movement whereby the retaining finger tabs 25 of the two arms 19 thus initially brought into assembly with the retaining bumps 13 will substantially engage retainingly behind the undercut retaining shoulders 14 of such retaining bumps. Then by applying generally axially inward pressure against the cover 5 adjacent to the remaining arm 19, or even against such arm, the retaining finger tabs 25 thereof will resiliently cam and snap over and behind the remaining retaining bump 13. The particular construction shown of the retaining finger tabs 25 affords them with substantial resilient flexibility, while nevertheless adequate stiffness to attain substantial resiliently tensioned retaining interengagement with the respective retaining bump shoulders 14, the retaining tension tending to cam the retaining fingers 25 axially inwardly along the inclined undercut retaining shoulders 14 to thus draw the cover axially inwardly firmly against the wheel shoulder 15.

It will be appreciated that the substantial cut back or recess 28 provides clearance between the retaining fingers 25 so as to clear the nose of the adjacent retaining bump and thus facilitate the press-on interengagement of the retaining fingers 25 with the retaining bumps. It will also be appreciated that by virtue of the flaring adjacent sides of the retaining fingers 25 resilient stiffness of the fingers increases from the tips thereof toward the base ends thereof where they join the body of the respective flange 22. By having the joining flange extensions 23 relatively narrow with relation to the overall width of the flanges 22 and provided with a recess 29 opposite the recess 28, resilient flexibility of the relatively narrow connecting flange portion of the flange bridge enhances the resilient flexibility of the retaining fingers 25 and their action in pressing the same over the retaining bumps 13, as well as for releasing the retaining fingers 25 from the bumps when it is desired to remove the cover from the wheel.

When it is desired to remove the cover from the wheel, a pry-off tool such as a screwdriver or the like may be applied behind the edge of the sidewall 18 of the cover adjacent to one of the arms 19 or even directly behind one of the arms and more particularly behind the retaining bridge provided by the connected turned flanges 22 and pry-off force applied to snap the retaining fingers 25 of such arm out of engagement with the respective retaining bump 13. In the three bump arrangement, release of one of the arms effects release from the remaining arms since the cover will then fall away.

Turning of the cover 5 on the wheel is prevented by the shouldering opposition of the radially inner portions of the axially inner margins of the arm side walls 20 relative to the generally circumferentially facing shoulders of the retaining bumps 13.

It will be understood that modifications and variations may be effected without departing from the scope of the novel concepts of the present invention.

I claim as my invention:

1. In a wheel structure including body and rim parts, one of said parts having generally radially projecting cover retaining bumps pressed therein and projecting from a circular surface thereof, a cover for disposition over the outer side of the wheel comprising a generally radially facing portion having hollow bump receiving members thereon provided with respective bump engaging cover retaining bridge means thereon, said bridge means comprising turned flange structure having retaining fingers directed toward and engageable under resilient tension with the retaining bumps.

2. In a wheel structure including body and rim parts, one of said parts having generally radially projecting cover retaining bumps pressed therein and projecting from a circular surface thereof, a cover for disposition over the outer side of the wheel comprising a generally radially facing portion having hollow bump receiving members thereon provided with respective bump engaging cover retaining bridge means thereon, said retaining bridge means being disposed adjacent to portions of the members shoulderingly opposing circumferential sides of the retaining bumps to hold the cover against turning.

3. In a wheel structure including a wheel body and a tire rim, the wheel body having an annular generally axially outwardly projecting nose bulge provided with a circumferentially spaced plurality of generally radially outwardly projecting cover retaining bumps which have undercut generally radially outwardly and axially inwardly facing retaining shoulders, a cover for disposition at the outer side of the wheel including a portion for generally opposing the radially outer side of the nose bulge and provided with generally radially extending hollow and axially inwardly opening spoke-like portions matching said bumps and receptive thereof, said spoke-like portions having retaining bridge structure across the axially inner sides thereof and provided with generally radially inwardly directed retaining means engageable under resilient retaining tension with said bump shoulders in press-on, pry-off relation.

4. In a wheel structure including a wheel body and a tire rim, the wheel body having an annular generally axially outwardly projecting nose bulge provided with a circumferentially spaced plurality of generally radially outwardly projecting cover retaining bumps which have undercut generally radially outwardly and axially inwardly facing retaining shoulders, a cover for disposition at the outer side of the wheel including a portion for generally opposing the radially outer side of the nose bulge and provided with generally radially extending hollow and axially inwardly opening spoke-like portions matching said bumps and receptive thereof, said spoke-like portions having retaining bridge structure across the axially inner sides thereof and provided with generally radially inwardly directed retaining means engageable under resilient retaining tension with said bump shoulders in press-on, pry-off relation, said hollow portions having, adjacent juncture thereof with the radially facing portion of the cover, shoulders which oppose circumferentially facing shoulders of the retaining bumps to hold the cover against turning on the wheel.

5. In a wheel structure including a wheel body and a tire rim, the wheel body having an annular generally axially outwardly projecting nose bulge provided with a circumferentially spaced plurality of generally radially outwardly projecting cover retaining bumps which have undercut generally radially outwardly and axially inwardly facing retaining shoulders, a cover for disposition at the outer side of the wheel including a portion for generally opposing the radially outer side of the nose bulge and provided with generally radially extending hollow and axially inwardly opening spoke-like portions matching said bumps and receptive thereof, said spoke-like portions having retaining bridge structure across the axially inner sides thereof and provided with generally radially inwardly directed retaining means engageable under resilient retaining tension with said bump shoulders in press-on, pry-off relation, said hollow portions comprising arms which extend into overlying relation to the tire rim.

6. In a wheel structure including a wheel body and a tire rim, the wheel body having an annular generally axially outwardly projecting nose bulge provided with a circumferentially spaced plurality of generally radially outwardly projecting cover retaining bumps which have undercut generally radially outwardly and axially inwardly facing retaining shoulders, a cover for disposition at the outer side of the wheel including a portion for generally opposing the radially outer side of the nose bulge and provided with generally radially extending hollow and axially inwardly opening spoke-like portions matching said pumps and receptive thereof, said spoke-like portions having retaining bridge structure across the axially inner sides thereof and provided with generally radially inwardly directed retaining means engageable under resilient retaining tension with said bump shoulders in press-on, pry-off relation, said radially facing portion of the cover having an axially inwardly directed shoulder and the wheel body having a shoulder on said nose bulge against which said cover shoulder engages firmly under the resilient retaining action of the bridge means.

7. In a wheel structure including a wheel body and a tire rim supported thereby, the wheel body having an annular generally axially outwardly projecting nose bulge with a plurality of generally radially outwardly projecting circumferentially spaced retaining bumps on the axially outer portion of the radially outer side of the nose bulge and with a circumferentially extending and generally axially outwardly facing shoulder on the radially outer side of the nose bulge generally aligned with axially inner end portions of undercut cover retaining shoulders of the retaining bumps, a cover for disposition over the outer side of the wheel including a hub cap body portion having a generally axially inwardly projecting side wall arranged to shoulder against the wheel body shoulder and interrupted at intervals corresponding to the retaining bumps by generally radially outwardly projecting spoke-like arms which are hollow and open to the interior of the hub cap and are also hollow axially inwardly and are provided with side walls spaced apart to receive the retaining bumps therebetween, said side walls having cover retaining bridge means across the inner margins thereof provided with generally radially inwardly directed cover retaining edge structure retainingly engageable with said bump shoulders in press-on, pry-off relation.

8. In a wheel structure including a wheel body and a tire rim supported thereby, the wheel body having an annular generally axially outwardly projecting nose bulge with a plurality of generally radially outwardly projecting circumferentially spaced retaining bumps on the axially outer portion of the radially outer side of the nose bulge and with a circumferentially extending and generally axially outwardly facing shoulder on the radially outer side of the nose bulge generally aligned with axially inner end portions of undercut cover retaining shoulders of the retaining bumps, a cover for disposition over the outer side of the wheel including a hub cap body portion having a generally axially inwardly projecting side wall arranged to shoulder against the wheel body shoulder and interrupted at intervals corresponding to the retaining bumps by generally radially outwardly projecting spoke-like arms which are hollow and open to the interior of the hub cap and are also hollow axially inwardly and are provided with side walls spaced apart to receive the retaining bumps therebetween, said side walls having cover retaining bridge means across the inner margins thereof provided with generally radially inwardly directed cover retaining edge structure retainingly engageable with said bump shoulders in press-on, pry-off relation, said spoke arms being of a length to overlie the tire rim and with the inner edges of the side walls of the spoke arms formed to lie in clearance relation to the tire rim so that the cover is supported entirely upon the wheel body.

9. In a cover for disposition over the outer side of a vehicle wheel, a cover body having a generally radially facing portion provided with generally radially projecting hollow spoke-like portions receptive of retaining projections on a wheel, said spoke-like portions having side walls between which retaining projections of a wheel are received and provided with retaining bridge structure across the margins of the side walls having cover retaining edge means engageable in press-on, pry-off relation with retaining projections of a wheel, said bridge structure comprising flange extensions from the side walls secured in overlapping relation.

10. In a cover for disposition over the outer side of a vehicle wheel, a cover body having a generally radially facing portion provided with generally radially projecting hollow spoke-like portions receptive of retaining projections on a wheel, said spoke-like portions having side walls between which retaining projections of a wheel are received and provided with retaining bridge structure across the margins of the side walls having cover retaining edge means engageable in press-on, pry-off relation with retaining projections of a wheel, said bridge structure comprising flange extensions from said side walls provided with relatively narrow tabs which are secured together.

11. In a cover for disposition over the outer side of a vehicle wheel, a cover body having a generally radially facing portion provided with generally radially projecting hollow spoke-like portions receptive of retaining projections on a wheel, said spoke-like portions having side walls between which retaining projections of a wheel are received and provided with retaining bridge structure attached to and extending between the margins of the side walls and having cover retaining edge means engageable in press-on, pry-off relation with retaining projections of a wheel, said projection engaging means of the bridge structure comprising generally radially projecting retaining fingers.

12. In a cover for disposition over the outer side of a vehicle wheel, a cover body having a generally radially facing portion provided with generally radially projecting hollow spoke-like portions receptive of retaining projections on a wheel, said spoke-like portions having side walls between which retaining projections of a wheel are received and provided with retaining bridge structure attached to and extending between the margins of the side walls and having cover retaining edge means engageable in press-on, pry-off relation with retaining projections of a wheel, said projection engaging means of the bridge structure comprising generally radially projecting retaining fingers, said retaining fingers having a clearance recess therebetween.

13. In a cover for disposition over the outer side of a vehicle wheel, a cover body having a generally radially facing portion provided with generally radially projecting hollow spoke-like portions receptive of retaining projections on a wheel, said spoke-like portions having side walls between which retaining projections of a wheel are received and provided with retaining bridge structure attached to and extending between the margins of the side walls and having cover retaining edge means engageable in press-on, pry-off relation with retaining projections of a wheel, said projection engaging means of the bridge structure comprising generally radially projecting retaining fingers, said retaining fingers having a clearance recess therebetween, there being a notch separating each of the retaining fingers from the side wall adjacent thereto.

14. In a cover for disposition over the outer side of a vehicle wheel, said cover having an axially inner side and an axially outer side and comprising a central crown portion and side wall, said side wall being interrupted at a plurality of circumferentially spaced intervals by integral generally radially outwardly projecting hollow arms opening toward the axially inner side of the cover and having side walls with the edges projecting inwardly, said side walls having attached thereto and extending therebetween cover retaining means with generally radially inwardly directed resiliently deflectable structure thereon engageable with retaining means on the wheel.

15. In a hub cap type cover for disposition over the outer side of a wheel, a sheet material shell having a side wall with integral hollow arms at circumferentially spaced intervals having side walls with cover retaining means attached thereto and extending therebetween, said cover retaining means comprising a bridge flange structure having resilient retaining edge means thereon.

16. In a hub cap type cover for disposition over the outer side of a wheel, a sheet material shell having a side wall with integral hollow arms at circumferentially spaced intervals having side walls with cover retaining means extending therebetween, said retaining means comprising respective flange extensions from the side walls turned into overlapping relation and secured together with recesses extending from the opposite sides of the overlap and with resilient cover retaining fingers alongside one of said recesses for resilient tensioned press-on, pry-off retaining interengagement with shoulder means on a wheel.

17. In a wheel structure including tire rim and body parts one of which has cover retaining shoulder means facing generally axially inwardly, a cover for disposition over the outer side of the wheel in press-on, pry-off relation, said cover including a central cap portion having projecting radially outwardly therefrom hollow axially inwardly opening spoke arm portions, said spoke arm portions having side walls spaced apart, said side walls having cover-retaining flanges attached thereto and bridging therebetween and providing resiliently deflectable cover retaining generally radially projecting edges engageable in press-on, pry-off relation with said cover retaining shoulder means of said one wheel part.

References Cited in the file of this patent

UNITED STATES PATENTS

| | | |
|---|---|---|
| D. 93,769 | Hunt | Nov. 6, 1934 |
| 978,516 | Turner | Dec. 13, 1910 |
| 1,201,926 | Blackwood | Oct. 17, 1916 |
| 1,987,223 | Zerk | Jan. 8, 1935 |
| 2,544,703 | Lyon | Mar. 13, 1951 |
| 2,819,929 | Hunt | Jan. 14, 1958 |